US006560128B1

(12) United States Patent
Rajda et al.

(10) Patent No.: US 6,560,128 B1
(45) Date of Patent: *May 6, 2003

(54) FERRORESONANCE-SUPPRESSING STATIC TRANSFER SWITCH

(75) Inventors: Janos Rajda, Mississauga (CA); Shashi Dewan, Toronto (CA)

(73) Assignee: SatCon Power Systems Canada Ltd., Burlington (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,900

(22) Filed: Feb. 12, 1999

(51) Int. Cl.7 .............................................. H02H 7/10
(52) U.S. Cl. ..................................................... 363/50
(58) Field of Search ............................. 363/39, 40, 50, 363/53

(56) References Cited

U.S. PATENT DOCUMENTS

| 3,634,701 | A | * | 1/1972 | Studtmann | |
|---|---|---|---|---|---|
| 3,675,110 | A | * | 7/1972 | Kelley, Jr. | 363/50 |
| 3,750,004 | A | * | 7/1973 | Walker | |
| 3,932,764 | A | * | 1/1976 | Corey | |
| T967,008 | I4 | * | 2/1978 | Sweetana, Jr. et al. | |
| 4,409,635 | A | * | 10/1983 | Kraus | |
| 4,410,935 | A | * | 10/1983 | Dang | 363/37 |
| 4,527,228 | A | * | 7/1985 | Yu | 363/98 |
| 4,583,004 | A | * | 4/1986 | Yearsin | |
| 4,677,535 | A | * | 6/1987 | Kawabata et al. | |
| 4,695,939 | A | * | 9/1987 | Canay | 363/39 |
| 4,717,841 | A | * | 1/1988 | Dunmortier et al. | |
| 4,792,887 | A | * | 12/1988 | Bernitz et al. | |
| 5,138,184 | A | * | 8/1992 | Keefe | |
| 5,210,685 | A | * | 5/1993 | Rosa | |
| 5,251,120 | A | * | 10/1993 | Smith | |
| 5,283,726 | A | * | 2/1994 | Wilkerson | |
| 5,621,621 | A | * | 4/1997 | Lilliestrale | 363/17 |
| 5,644,175 | A | * | 7/1997 | Galm | |
| 5,646,459 | A | * | 7/1997 | Hatate et al. | |
| 5,689,410 | A | * | 11/1997 | Jiang | |
| 5,694,312 | A | * | 12/1997 | Brand et al. | |
| 5,907,234 | A | * | 5/1999 | Sadek et al. | 323/210 |
| 6,016,258 | A | * | 1/2000 | Jain et al. | 363/17 |

OTHER PUBLICATIONS

S&C Electric Company, S&C PureWave Source–Transfer System, The Need for Reliable Power Has Never Been Greater, Mar. 29, 1999, pp. 1–8.
The Institute of Electrical and Electronics Engineers, Inc., IEEE Guide for Application of Transformer Connections in Three–Phase Distribution System, Jun. 2, 1977, pp. 1–34.

* cited by examiner

Primary Examiner—Adolf Deneke Berhane
(74) Attorney, Agent, or Firm—Robert J. Graham; Gowling Lafleur Henderson LLP (57) ABSTRACT

A static transfer switch for reducing ferroresonance in a load consisting of a first switch for connecting and disconnecting a primary power source to and from the load, and a second switch for connecting and disconnecting a secondary power source to and from the load. Each switch includes a snubber circuit connected across the respective switch. An attenuator, consisting of a resistor in series with a capacitor, is connected between the first and second switches and ground and suppresses series ferroresonance at the load by reducing the voltage applied to the load when both the first and second switches are open and power is applied to or removed from the load.

28 Claims, 4 Drawing Sheets

FERRORESONANCE-SUPPRESSING STATIC TRANSFER SWITCH

FIELD OF THE INVENTION

The present invention relates to a static transfer switch for switching a load between multiple power sources in response to a drop in quality of the power delivered from one of the power sources. In particular, the present invention relates to a ferroresonance-suppressing solid-state static transfer switch for switching a load from one medium-voltage primary power source to another medium-voltage secondary power source in response to a voltage loss, sag or other transient condition existing on the primary source, without the need for mechanical bypass switches.

BACKGROUND OF THE INVENTION

Many commercial and industrial users of electronic and electrical equipment depend upon their power utility to supply power continuously at a reasonably constant frequency and voltage. A voltage spike, sag, brownout or other reduction in power quality (hereinafter referred to as a supply event) on the power lines feeding such high power consumers can lead to costly assembly and/or process line shutdowns and damage to sensitive electronic equipment. As a result, many medium-voltage power consumers make use of a secondary power source to supply power in the event of a supply event in the power supplied from the primary power source.

Often, the secondary source of power is derived from a secondary or backup power utility or onsite power generation system. The power distribution lines from the primary and the second power sources are coupled to the power consumer through a transfer switch which, until recently, consisted of a number of mechanical switches which switched the consumer from the primary power source to the secondary power source in response to a supply event in the power supplied by the primary power source. However, mechanical transfer switches can take up to 10 power cycles to effect the changeover between the primary and the secondary utility. Since industrial users of microprocessor-controlled equipment, and other power supply sensitive equipment, cannot tolerate a loss of power for more than a half power cycle, the delay associated with mechanical transfer switches is often unacceptable.

Due to the rapid response times of solid-state switches over mechanical switches, solid-state static transfer switches (STS) have been developed recently as a replacement for the conventional mechanical transfer switch. A conventional single-phase static transfer switch consists of a pair of solid-state switches. The first solid-state switches connects and disconnects the power consumer to and from the primary power source, while the second solid-state switch connects and disconnects the power consumer to and from the secondary power source.

Each solid-state switch generally comprises a pair of silicon-controlled rectifier (SCR) switches, or gated turn-off (GTO) switches connected back-to-back. While the quality of the power supplied by the primary power source is adequate for the power consumer, control logic forces the first solid-state switch to conduct, thereby connecting the power consumer to the primary power source. However, when a supply event occurs on the power distribution lines of the primary power source, the control logic prevents the first solid-state switch from conducting, thereby disconnecting the power consumer from the primary power source. At virtually the same time, the control logic forces the second solid-state switch to conduct, thereby connecting the power consumer to the secondary power source.

As is well known by those skilled in the art, SCR switches can conduct current, without the appropriate gating signals, if the rate of change of voltage drop across the SCR switch exceeds a threshold value. This characteristic can be problematic when, for example, a supply event occurs from the secondary power source while the power consumer is receiving power from the primary power source. The supply event can cause the second solid-state switch to conduct, thereby shorting the primary power source to the secondary power source. To avoid this possibility, the first solid state switch generally includes a RC snubber circuit connected across the first switch for limiting the maximum rate of change of voltage drop across the first switch. Similarly, the second solid state switch includes a RC snubber circuit connected across the second switch for limiting the maximum rate of change of voltage drop across the second switch.

It is also well known that when the gate terminal of a SCR is driven with a gate voltage which causes the SCR to conduct, a rapid increase in the magnitude of current through the SCR can give rise to a localized hot spot adjacent the gate terminal of the SCR, leading to subsequent failure of the SCR. Therefore, if the power consumer load is inductive, the solid-state SCR switches can be subjected to a large inrush of current when power is first supplied to the power consumer, until the resulting magnetic field induced in the load has developed sufficiently to oppose the current inrush. As a result, the conventional STS generally includes a remotely-controlled motorized mechanical by-pass switch, connected across the solid-state SCR switches, to avoid exceeding the maximum tolerable rate of change of current through the solid-state SCR switches at initial application of power to the power consumer. The mechanical by-pass switch is kept closed until the current through the load has stabilized. Thereafter, the mechanical by-pass switch is opened to allow the solid-state SCR switches to control the transfer of power, as described above.

Although motorized mechanical by-pass switches reduce the likelihood of damage to the solid-state SCR switch, motorized mechanical by-pass switches increase the cost and size of the conventional STS. Therefore, for some time it has been desirable to eliminate motorized mechanical by-pass switches from the conventional STS without increasing the failure rate of the STS. SCR technology has evolved to the extent that SCRs are now able to tolerate higher rates of change of current than previously possible. Nevertheless, the use of such solid-state SCR switches in static transfer switches without motorized mechanical by-pass switches has inexplicably resulted in early failure of the STS.

SUMMARY OF THE INVENTION

It is an object of the present invention to provide a novel static transfer switch which eliminates or mitigates the disadvantages of the prior art by reducing the likelihood of early failure of the static transfer switch without having to resort to the use of mechanical by-pass switches to control the transfer of power.

The inventors of the present invention have discovered that early failure of the conventional STS results from series ferroresonance occurring in the load transformer. Ferroresonance is a series resonance phenomenon associated with undamped resonant circuits comprising a capacitive element and an iron-cored inductive element, whereby line voltage harmonics present in the power source cause the resonant circuit to have sustained high voltage oscillations. Ferroresonance results from line voltage harmonics present in the power source causing the undamped circuit to oscillate at high voltage which, in turn, causes the magnetic flux generated in the iron core of the inductive element to saturate the iron core. As the iron core becomes saturated, the inductance of the inductive element varies which, in conjunction with the capacitive element, causes the resonant frequency of the circuit to vary. If harmonics are present in the power source at any of the new resonant frequencies, the undamped circuit will continue to oscillate at high voltage.

The inventors have discovered that when the conventional STS circuit is coupled to an iron-cored load transformer and the load transformer is energized or de-energized at no load, the RC snubber leakage currents can increase the magnetic field of the load transformer, causing the iron core of the load transformer to saturate and the inductance of the load transformer to vary. The varying inductance of the load transformer, in conjunction with the capacitance of the snubber circuits, causes the conventional STS circuit to oscillate and the voltage drop across the transformer and the solid state switches to surge well above maximum ratings, thereby damaging the load transformer and the solid-state switches.

After extensive study of the problem, the inventors invented a solid-state static transfer switch which eliminates or at least substantially reduces series ferroresonance at the load without resorting to motorized mechanical by-pass switches. The solid-state static transfer switch, according to the present invention, comprises switch means for coupling a first and a second power source to a load, and an attenuator coupled to the switch means for suppressing series ferroresonance at the load by attenuating the power applied to the load when the switch means is open. As a result, the possibility of the transformer core or the magnetizing inductance becoming saturated and the possibility of series ferroresonance occurring at the load transformer, at power-up and power-down of the load transformer, are substantially reduced.

BRIEF DESCRIPTION OF THE DRAWINGS

The preferred embodiments of the invention will now be described, by way of example only, with reference to the drawings, in which.

DETAILED DESCRIPTION OF THE PREFERRED EMBODIMENTS

Figure 1:
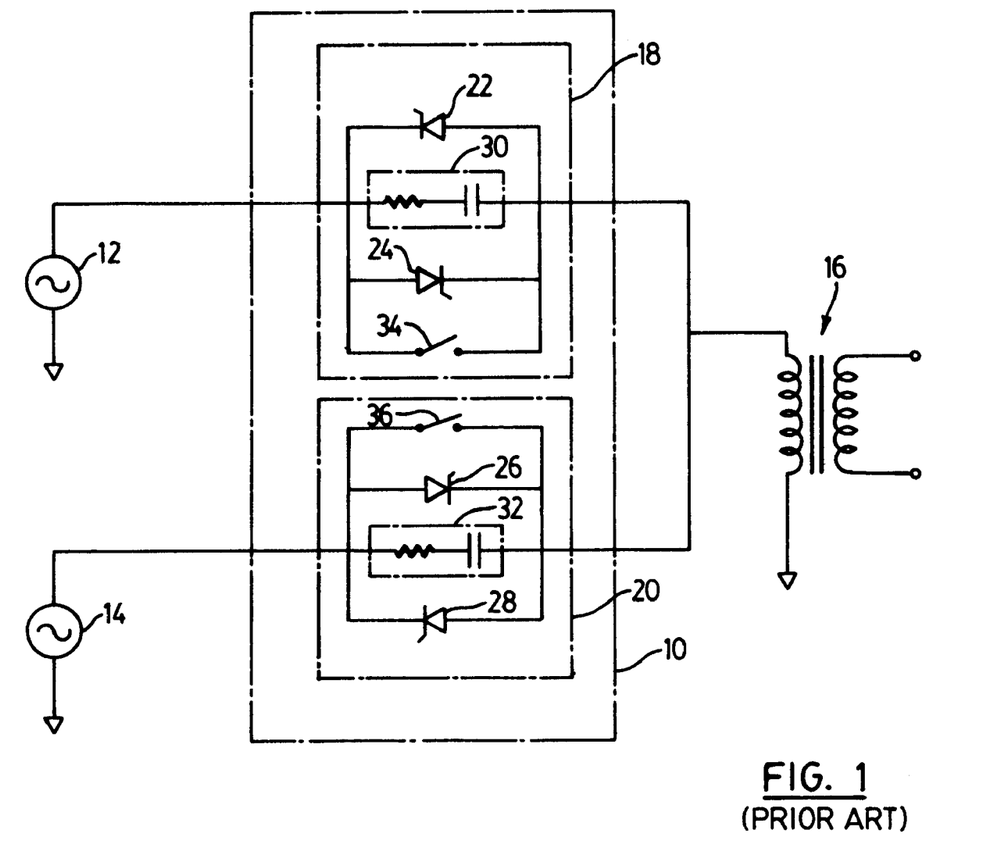
FIG. 1 is a schematic circuit diagram of a prior art solid-state static transfer switch.
Figure 2:
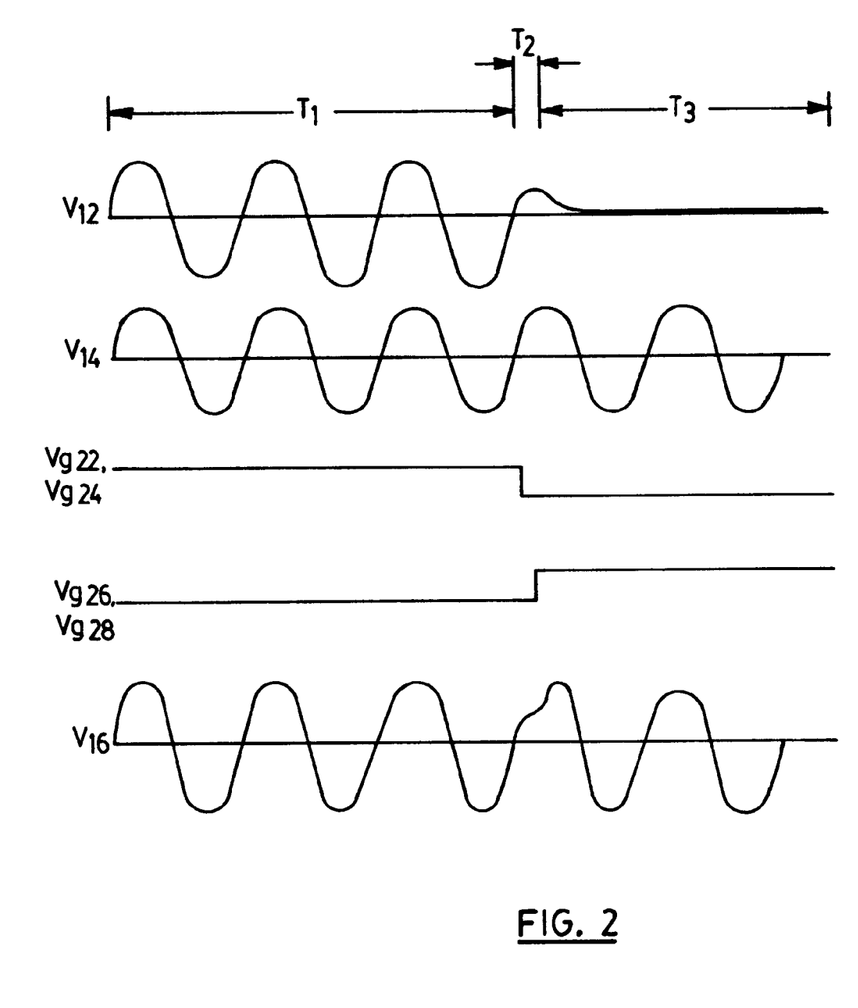
FIG. 2 is a waveform diagram of AC source voltage and load voltage as a static transfer switch switches a load between two AC sources.

Before describing the preferred embodiments of the present invention, a detailed discussion of a conventional static transfer switch will be presented with reference to FIGS. 1 and 2. Turning to FIG. 1, a conventional single-phase static transfer switch (STS) 10 is shown coupling a primary power source 12 and a secondary power source 14 to a primary winding of a load transformer 16. The static transfer switch 10 comprises a first solid-state switch 18 for connecting and disconnecting the primary AC power source 12 to and from the load transformer 16 primary, and a second solid-state switch 20 for connecting and disconnecting the secondary AC power source 14 to and from the load transformer 16 primary.

The first solid-state switch 18 comprises first and second silicon-controlled rectifier (SCR) switches 22, 24 connected together back-to-back such that the anode of the first SCR switch 22 is connected to the cathode of the second SCR switch 24, and the anode of the second SCR switch 24 is connected to the cathode of the first SCR switch 22. Similarly, the second solid-state switch 20 comprises third and fourth SCR switches 26, 28 connected together back-to-back such that the anode of the third SCR switch 26 is connected to the cathode of the fourth SCR switch 28, and the anode of the fourth SCR switch 28 is connected to the cathode of the third SCR switch 26. The gate terminals of the SCR switches 22, 24, 26, 28 are connected to control logic (not shown) for switching the load transformer 16 between the first and second AC power source 12, 14.

As described above, to reduce the possibility of the first or second solid-state switch 18, 20 inadvertently turning-on in response to excessively large changes in voltage drop across the first or second solid-state switch 18, 20, the first solid state switch 18 includes a RC snubber circuit 30 connected across the first and second SCR switches 22, 24. Similarly, the second solid state switch 20 includes a RC snubber circuit 32 connected across the third and fourth SCR switches 26, 28. In addition, to avoid exceeding the maximum tolerable rate of change of current through the SCR switches 22, 24, 26, 28 at initial application of power to the conventional STS 10, the first solid-state switch 18 includes a mechanical by-pass switch 34 connected across the first and second SCR switches 22, 24, and the second solid-state switch 20 includes a mechanical by-pass switch 36 connected across the third and fourth SCR switches 26, 28.

The waveform diagram shown in FIG. 2 shows the voltage signals present in the conventional STS 10 shown in FIG. 1. For simplicity, the voltage signals $V_{12}$, $V_{14}$ of the primary and secondary power source 12, 14 are shown in FIG. 2 as being substantially sinusoidal in shape and in phase with each other. During the interval $T_1$, control logic drives the gate terminals of the first and second SCR switches 22, 24 with voltage signals $Vg_{22}$, $Vg_{24}$ which force the first and second SCR switches 22, 24 to conduct. During the same period, the control logic drives the gate terminals of the third and fourth SCR switches 26, 28 with voltage signals $Vg_{26}$, $Vg_{28}$ which prevent the third and fourth SCR switches 26, 28 from conducting. As a result, during the interval $T_1$, the load transformer 16 is coupled to the primary power source 12 and is isolated from the secondary power source 14.

During the interval $T_2$, a power brownout is shown occurring on the primary power source 12, causing the voltage $V_{16}$ at the load transformer 16 primary to drop. Sensors monitoring the quality of power delivered by the primary and secondary power source 12, 14 sense the drop in power quality. During the interval $T_3$, the control logic responds to the drop in power quality by driving the gate terminals of the first and second SCR switches 22, 24 with voltage signals $Vg_{22}$, $Vg_{24}$ which prevent the first and second SCR switches 22, 24 from conducting. After the first and second SCR switches 22, 24 have turned off, the control logic drives the gate terminals of the third and fourth SCR switches 26, 28 with voltage signals $V_{g_{26}}$, $V_{g_{28}}$ which force the third and fourth SCR switches 26, 28 to conduct. As a result, during the interval $T_3$, the load transformer 16 primary is coupled to the secondary power source 14 and is isolated from the primary power source 12.

It will be observed that the interval $T_2$ represents a period of changeover between the primary and secondary power source 12, 14 during which the voltage $V_{16}$ at the load transformer 16 primary is not sinusoidal and is not of the desired magnitude. However, the period $T_2$ is less than 4 ms, which is less than the generally accepted figure of 8.3 ms recommended by the CBEMA (Computer Business Equipment Manufacturer's Association) Curve for the duration of voltage excursions and power outages which can be tolerated by computer equipment. The interval $T_2$ may be shortened by forcing the third and fourth SCR switches 26, 28 to conduct earlier, at the risk of possibly damaging the secondary power source 14 by shorting the secondary power source 14 to the failed primary power source 12.

Figure 3:
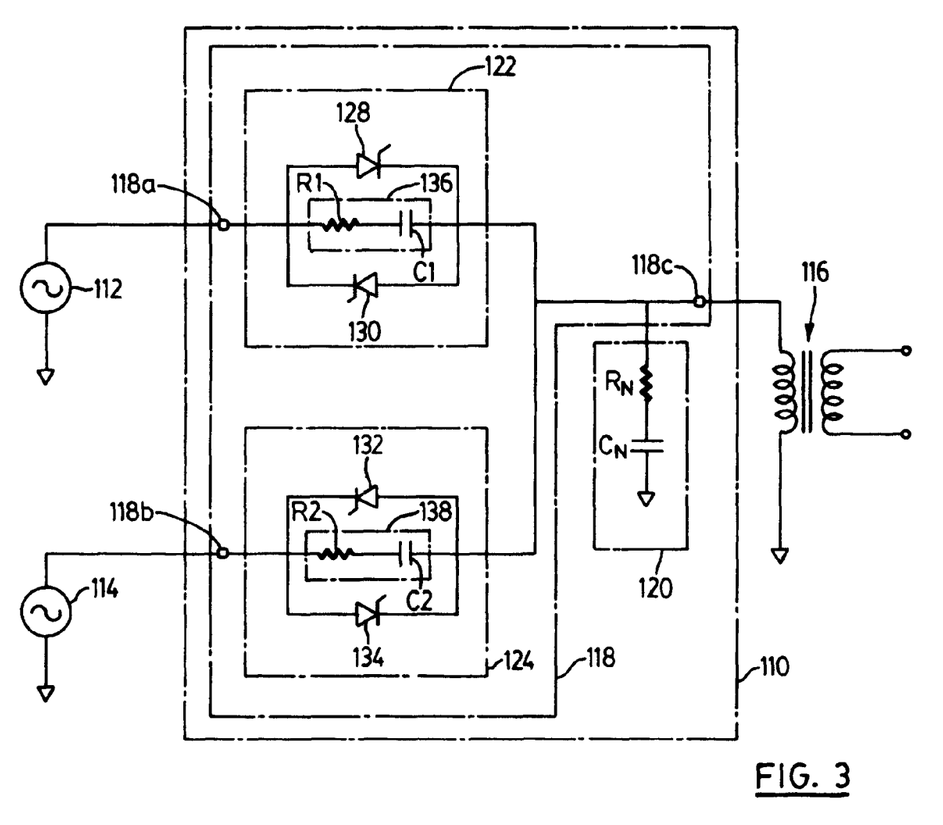
FIG. 3 is a schematic diagram of a single-phase solid-state static transfer switch according to a first embodiment of the invention.

A first embodiment of the present invention will now be discussed with reference to FIG. 3. In FIG. 3, a single-phase series ferroresonance-suppressing solid-state static transfer switch 110 is shown coupling a first single-phase power source 112 and a second single-phase power source 114 to a primary winding of a load transformer 116. The solid-state static transfer switch 110 comprises switch means 118 for connecting and disconnecting the first power source 112 and the second power source 114 to and from the load transformer 116 primary, and an attenuator 120 coupled to the switch means 118 for attenuating the power applied to the load transformer 116 when the switch means 118 is open. The switch means 118 includes a first input 118a for coupling the switch means 118 to the first power source 112, a second input 118b for coupling the switch means 118 to the second power source 114, and a switch output 118c for coupling the switch means 118 to the load transformer 116 primary. A first mechanical by-pass switch (not shown) is connected between the first input 118a and the switch output 118c for maintenance purposes. Similarly, a second mechanical by-pass switch (not shown) is connected between the second input 118b and the switch output 118c.

Switch means 118 comprises a first solid-state switch 122 for coupling the first power source 112 to the load transformer 116 primary, and a second solid-state switch 124 for coupling the second power source 114 to the load transformer 116 primary. However, it should be understood at the outset that although the static transfer switch 110 is shown in FIG. 3 comprising only two solid-state switches for coupling to two power sources, the invention is not limited to only two power sources. Rather, the static transfer switch 110 can be used for coupling to more than two power sources. In such applications, the static transfer switch 110 would include as many solid-state switches as there were power sources.

The first solid-state switch 122 comprises first and second silicon-controlled rectifier (SCR) switches 128, 130, and the second solid-state switch 124 comprises third and fourth SCR switches 132, 134. Silicon-controlled rectifier switches are a preferred switch for the first and second solid-state switches 122, 124 because of their ability to handle large load currents and their speed and ease of use. However, other solid-state switches, such as gated turn-off thyristors (GTO) may be used, as the requirements of the application demanded. Alternately, the first and second solid state switch 122, 124 could be replaced with mechanical switches, at the expense of reducing the speed of the static transfer switch 110.

The first and second SCR switches 128, 130 are connected together back-to-back such that the anode of the first SCR switch 128 is connected to the cathode of the second SCR switch 130, and the anode of the second SCR switch 130 is connected to the cathode of the first SCR switch 128. Similarly, the third and fourth anti-parallel SCR switches 132, 134 are connected together back-to-back such that the anode of the third SCR switch 132 is connected to the cathode of the fourth SCR switch 134, and the anode of the fourth SCR switch 134 is connected to the cathode of the third SCR switch 132. The gate terminals of the SCR switches 128, 130, 132, 134 are connected to control logic (not shown) for switching the load transformer 116 between the first and second AC power sources 112, 114.

A snubber circuit 136 is connected across the first solid-state switch 122 for limiting the rate of change of voltage drop across the first solid-state switch 122. Similarly, a snubber circuit 138 is connected across the second solid-state switch 124 for limiting the rate of change of voltage drop across the second solid-state switch 124. The snubber circuit 136 comprises a snubber resistive element $R_1$ connected in series with a snubber capacitive element $C_1$, and the snubber circuit 138 comprises a snubber resistive element $R_2$ connected in series with a snubber capacitive element $C_2$. Each snubber capacitive element $C_1$, $C_2$ is effectively in series with the load transformer 116 primary.

Preferably, the resistance of the snubber resistive element $R_1$ is equal to the resistance of the snubber resistive element $R_2$, and the capacitance of the snubber capacitive element $C_1$ is equal to the capacitance of the snubber capacitive element $C_2$. However, it should be understood that the snubber circuits 136, 138 are not essential elements of the invention. Since the snubber circuits 136, 138 merely serve to prevent the SCR switches 128, 130, 132, 134 from inadvertently conducting when subjected to large instantaneous changes in voltage drop, the snubber circuits 136, 138 can be eliminated from the static transfer switch 110 in less demanding applications, such as where the SCR switches 128, 130, 132, 134 are not subjected to large instantaneous changes in voltage drop or where the SCR switches 128, 130, 132, 134 are replaced with mechanical switches or other suitable forms of solid-state switches which are not subject to uncontrolled turn-on.

If the static transfer switch 110 included only the SCR switches 128, 130, 132, 134 and the snubber circuits 136, 138 and power from the first and second power sources 112, 114 was applied to or removed from the static transfer switch 110 when the first and second solid-state switches 122, 124 were both open and when the load transformer 116 was unloaded or lightly loaded, the static transfer switch 110 would allow voltage harmonics, generated by the presence of other non-linear loads connected to the power sources 112, 114, to be applied to the load transformer 116 primary. The load transformer 116 and the SCR switches 128, 130, 132, 134 would then be subjected to high voltage series ferroresonance oscillations, initially at a radian frequency $\omega_R$ of approximately $1/\sqrt{LC}$, where:
L=the inductance of the unsaturated transformer 116 primary;
C=the capacitance at the transformer 116, which includes the effective capacitance of $C_1$ and $C_2$, plus any stray capacitance of the power distribution lines,
and then at varying frequencies as the transformer 116 core became saturated. As discussed above, these high voltage oscillations could damage the load transformer 116 and the first and second solid-state switches 122, 124.

To reduce the likelihood of these high voltage oscillations occurring, the static transfer switch 110 includes an attenuator 120 coupled to the switch means 118 for attenuating the power applied to the load transformer 116 when the switch means 118 is open. In FIG. 3, the attenuator 120 is shown connected between the load transformer 116 primary and the switch output 118c at one end, and ground at the other end. Alternately, in applications where the first and second AC power sources 112, 114 are floating AC power sources, the attenuator 120 can be connected across the load transformer 116 primary.

The attenuator 120 is shown comprising an attenuator resistor $R_N$ connected in series with an attenuator capacitor $C_N$, with the capacitance of the attenuator capacitor $C_N$ being much greater than the capacitance C of the snubber capacitive elements $C_1$, $C_2$. In applications where snubber circuits are not required, such as where the SCR switches 128, 130, 132, 134 are replaced with switches not subject to uncontrolled turn-on, but the load transformer 116 is exposed to other sources of capacitance C' in series with the load transformer primary 116 sufficient to cause series ferroresonance, the capacitance of the attenuator capacitor $C_N$ should be greater than the series capacitance C'.

In effect, the attenuator 120, shown in FIG. 3, acts as a capacitive voltage divider dividing the voltage delivered from the first and second power sources 112, 114 between the snubber capacitive elements $C_1$, $C_2$ and the attenuator capacitor $C_N$. As a result, the magnitude of the voltage applied to the load transformer 116 primary, while the first and second solid-state switches 122, 124 are both open, is reduced by the attenuator 120, thereby reducing the likelihood of load transformer 116 core saturation. After the voltage harmonics generated by the application or removal of power to or from the static transfer switch 110 have subsided, the capacitance of the snubber capacitive elements $C_1$, $C_2$ is then removed from the static transfer switch 110 by the closure of either of the first and second solid-state switches 122, 124, thereby applying full power to the load transformer 116 primary.

The attenuator resistor $R_N$ acts as a high frequency oscillation suppressor which reduces the likelihood of high frequency oscillations being induced in the static transfer switch 110 should the static transfer switch 110 be subjected to high frequency transient impulses, such as those which would be induced if the static transfer switch 110 or the power distribution lines from the first or second power sources 112, 114 were struck by lightning. Therefore, in one variation of the invention, the attenuator resistor $R_N$ is eliminated from the attenuator 120, and the attenuator 120 comprises only the capacitor $C_N$. This variation can be used where other means are used to protect the static transfer switch 110 from lightning impulses, or where such protection is not required. However, this variation is not preferred due to the possibility of oscillations developing in the static transfer switch 110 and the load transformer 116, and due to the possibility of damage to the capacitor $C_N$ from large instantaneous changes in voltage drop across the capacitor $C_N$.

In another variation, the attenuator 120 comprises only the resistor $R_N$. In this variation, the attenuator 120 dampens any oscillations which might otherwise occur in the load transformer 116. However, this latter variation is not preferred due to the increased power dissipation caused by the attenuator 120.

In yet another variation, the solid-state static transfer switch 110 couples the first and second power sources 112, 114 to a capacitive load and an inductive element. In this latter variation, the capacitance of the attenuator capacitor $C_N$ is much greater than the effective capacitance C of the load and the of snubber capacitive elements. As a result, the magnitude of the voltage applied to the capacitive load while the first and second solid-state switches 122, 124 are both open is reduced. Other variations will be apparent to those skilled in the art.

Figure 4:
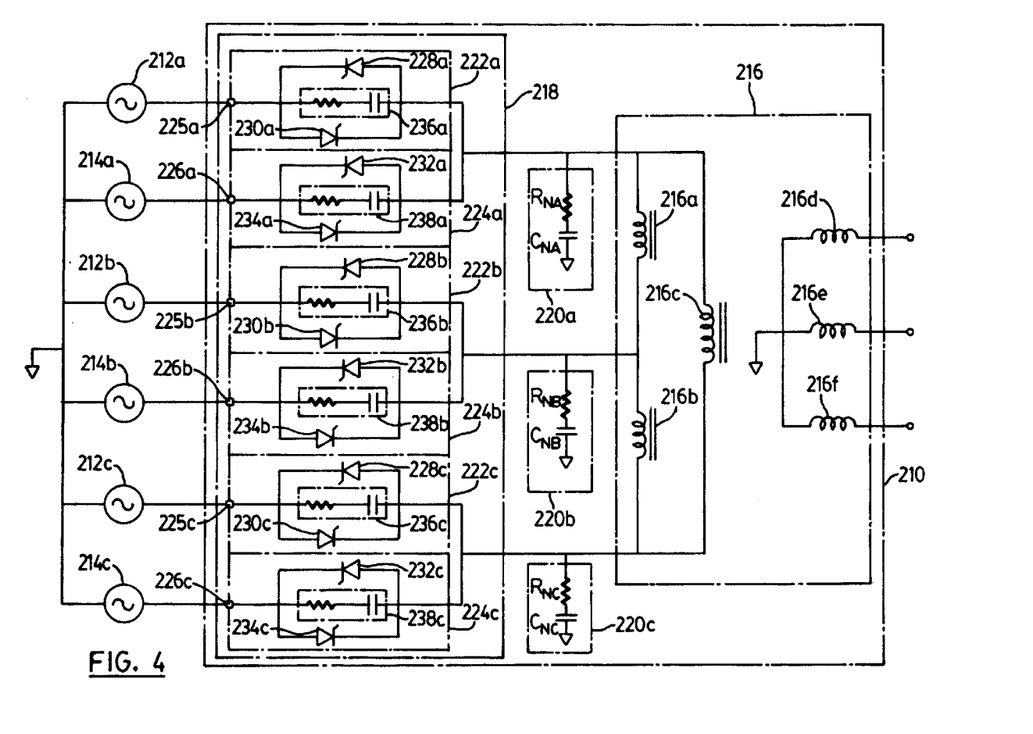
FIG. 4 is a schematic diagram of a three-phase solid-state static transfer switch system according to a second embodiment of the invention.

A second embodiment of the present invention will now be discussed with reference to FIG. 4. In FIG. 4, a three-phase series ferroresonance-suppressing solid-state static transfer switch 210 is shown coupling the three phases 212a, 212b, 212c of a first three-phase power source 212, and the three phases 214a, 214b, 214c of a second three-phase power source 214 to the three phases 216a, 216b, 216c of the primary of a three-phase load transformer 216. The static transfer switch 210 comprises switch means 218 for connecting and disconnecting the first and second power source 212, 214 to and from the load transformer 216 primary, and an attenuator 220 (comprising attenuator circuits 220a, 220b, 220c) coupled to the switch means 218 and the load transformer 216 primary for for attenuating the power applied to the load transformer 216 when the switch means 218 is open.

The first and second three-phase power sources 212, 214 are shown in FIG. 4 as being wye-configured power sources coupled to ground. However, if desired, the first and second three-phase power sources 212, 214 may be delta-configured and/or left floating. Similarly, the load transformer 216 is shown in FIG. 4 as being a delta-wye load transformer comprising primary phases 216a, 216b, 216c, and secondary phases 216d, 216e, 216f. However, if desired, the load transformer 216 may adopt some other configuration, such as wye-wye.

The switch means 218 comprises a first switch 222 (comprising solid-state switches 222a, 222b, 222c) for coupling the three-phases 212a, 212b, 212c of the first power source 212 to the three-phases 216a, 216b, 216c of the load transformer 216 primary, and a second switch 224 (comprising solid-state switches 224a, 224b, 224c) for coupling the three-phases 214a, 214b, 214c of the second power source 212 to the three-phases 216a, 216b, 216c of the load transformer 216 primary.

The solid-state switch 222a of the first switch 222 includes input 225a for coupling phase 212a of the first power source 212 to the load transformer primary phases 216a, 216c. The solid-state switch 222b of the first switch 222 includes input 225b for coupling phase 212b of the first power source 212 to the load transformer primary phases 216a, 216b. The solid-state switch 222c of the first switch 222 includes input 225c for coupling phase 212c of the first power source 212 to the load transformer primary phases 216b, 216c. Similarly, the solid-state switch 224a of the second switch 224 includes input 226a for coupling phase 214a of the second power source 214 to the load transformer primary phases 216a, 216c. The solid-state switch 224b of the second switch 224 includes input 226b for coupling phase 214b of the second power source 214 to the load transformer primary phase 216a, 216b. The solid-state switch 224c of the second switch 224 includes input 226c for coupling phase 214c of the second power source 214 to the load transformer primary phase 216a, 216c.

Solid-state switch 222a comprises SCR switches 228a, 230a, connected back-to-back. Similarly, solid-state switch 222b comprises SCR switches 228b, 230b, connected back-to-back; solid-state switch 222c comprises SCR switches 228c, 230c, connected back-to-back; solid-state switch 224a comprises SCR switches 232a, 234a, connected back-toback; solid-state switch 224b comprises SCR switches 232a, 234a, connected back-to-back; and solid-state switch 224c comprises SCR switches 232a, 234a, connected back-to-back.

The gate terminals of the SCR switches 228, 230, 232, 234 are connected to control logic (not shown) for switching the load transformer 216 between the first and second AC power sources 212, 214.

A snubber circuit 236a, comprising a snubber resistive element in series with a snubber capacitive element, is connected across the solid-state switch 222a. Similar snubber circuits 236b, 236c, 238a, 238b, 238c are respectively connected across the solid state switches 222b, 222c, 224a, 224b, 224c. The capacitance of each snubber circuit 236, 238 is effectively in series with the respective transformer primary phases 216a, 216b, 216c.

The attenuator 220 comprises three attenuator circuits 220a, 220b, 220c. Each attenuator circuit 220a, 220b, 220c comprises an attenuator resistor in series with an attenuator capacitor, with each attenuator capacitor having a capacitance greater than that of each snubber capacitive element. However as discussed above, if snubber circuits are not required, but the load transformer 216 is exposed to other sources of capacitance C' in series with the load transformer primary 216a, 216b, 216c sufficient to cause series ferroresonance, the capacitance of each attenuator capacitor should be greater than the series capacitance C'. Further, attenuator circuits 220a, 220b, 220c may be replaced with resistor-only attenuator circuits, capacitor-only attenuator circuits, or other suitable attenuator circuits if desired.

Attenuator circuit 220a is connected to the junction of the load transformer 216 primary phases 216a, 216c at one end, and to ground at the other end. Attenuator circuit 220b is connected to the junction of the load transformer 216 primary phases 216a, 216b at one end, and to ground at the other end. Attenuator circuit 220c is connected to the junction of the load transformer 216 primary phases 216b, 216c at one end, and to ground at the other end. However, in applications where the primary and secondary power sources 212, 214 are floating power sources, each attenuator circuit 220a, 220b, 220c can be connected across a respective one of the phases 216a, 216b, 216c of the load transformer 216 primary.

In a preferred implementation of the invention, the static transfer switch 210 is coupled to 25 kilovolt power sources. Each snubber resistive element comprises 16 10-ohm resistors connected in series, and each snubber capacitive element comprises 16 1-microfarad capacitors connected in series. As a result, each snubber resistive element has a resistance of 160 ohms and each snubber capacitve element has a capacitance of 62.5 nanofarads. Each attenuator resistor comprises a 100 ohm resistor, and each attenuator capacitor comprises a 125 nanofarad capacitor. In this implementation, the capacitance of the attenuator capacitor is at least twice that of the snubber capacitive element.

The description of the preferred embodiments is intended to be illustrative, rather than exhaustive of the present invention. Those persons of ordinary skill will be able to make certain additions, deletions, and/or modifications to the embodiments disclosed without departing from the spirt or scope of the invention, as defined by the appended claims.

We claim:

1. A ferroresonance-suppressing static transfer switch for connecting and disconnecting a first and a second power source to and from a load, the static transfer switch comprising:

switch means configured to couple the first and second power source to the load, the switch means including a switch output for coupling the switch means to the load; and a capacitive voltage divider coupled to the switch means and configured to attenuate the voltage applied to the load when the switch means is open for suppressing series ferroresonance at the load.

2. The static transfer switch according to claim 1, wherein the voltage divider comprises a resistive element.

3. The static transfer switch according to claim 1, wherein the voltage divider comprises a resistive element in series with a first capacitive element.

4. The static transfer switch according to claim 1, wherein the switch means includes a snubber circuit for limiting a rate of change of voltage drop across the switch means.

5. The static transfer switch according to claim 4, wherein the voltage divider comprises a resistive element in series with a first capacitive element, and the snubber circuit comprises a second capacitive element having a capacitance substantially less than a capacitance of the first capacitive element.

6. The static transfer switch according to claim 5, wherein the capacitance of the first capacitive element is at least twice the capacitance of the second capacitive element.

7. The static transfer switch according to claim 1, wherein the voltage divider is coupled to the switch output.

8. The static transfer switch according to claim 1, wherein each said power source comprises a single-phase AC power source, the load comprises a single-phase inductive load, and the switch means comprises a first switch for coupling the first power source to the load, and a second switch for coupling the second power source to the load.

9. The static transfer switch according to claim 8, wherein each said switch comprises a solid-state switch.

10. The static transfer switch according to claim 9, wherein each said solid-state switch comprises a pair of silicon-controlled rectifier switches connected back-to-back.

11. The static transfer switch according to claim 1, wherein each said power source comprises a three-phase AC power source, the load comprises a three-phase inductive load, and the switch means comprises a first switch for coupling each said first power source phase to a respective one of the load phases, and a second switch for coupling each said second power source phase to a respective one of the load phases.

12. The static transfer switch according to claim 11, wherein each said switch comprises three solid-state switches.

13. The static transfer switch according to claim 12, wherein each said solid-state switch comprises a pair of silicon-controlled rectifier switches connected back-to-back.

14. The static transfer switch according to claim 12, wherein the voltage divider comprises three voltage divider circuits, each said voltage divider circuit being coupled to a respective one of the solid state switches for suppressing the ferroresonance at each said load phase.

15. The static transfer switch according to claim 14, wherein each said voltage divider circuit is coupled between said respective solid-state switch and ground.

16. A ferroresonance-suppressing switching system comprising:

a load transformer;

switch means coupled to the load transformer and configured to couple a first power source and a second power source to the load transformer; and a capacitive voltage divider coupled to the switch means and the load transformer and configured to attenuate the voltage applied to the load transformer when the switch means is open for suppressing series ferroresonance at the load transformer.

17. The switching system according to claim 16, wherein each said power source comprises a three-phase AC power source, the load transformer comprises a three-phase load transformer, and the switch means comprises a first switch for connecting and disconnecting each said first power source phase to and from a respective one of the load transformer primary phases, and a second switch for connecting and disconnecting each said second power source phase to and from a respective one of the load transformer primary phases.

18. The switching system according to claim 17, wherein the voltage divider comprises three voltage divider circuits, each said voltage divider circuit being coupled to a respective one of the load transformer primary phases.

19. The switching system according to claim 18, wherein each said voltage divider circuit comprises a resistive element in series with a first capacitive element.

20. The switching system according to claim 17, wherein each said switch comprises three solid-state switches.

21. The switching system according to claim 20, wherein each said solid-state switch includes a snubber circuit for limiting a rate of change of voltage drop across the respective solid-state switch.

22. The switching system according to claim 21, wherein the voltage divider comprises three voltage divider circuits, each said voltage divider circuit being coupled to a respective one of the load transformer primary phases and comprising a resistive element in series with a first capacitive element, and each said snubber circuit comprises a second capacitive element having a capacitance substantially less than a capacitance of the first capacitive element.

23. The switching system according to claim 17, wherein each said three-phase AC power source comprises a wye-configured three-phase AC voltage source coupled to ground, and each said voltage divider circuit is coupled between a respective one of the load transformer primary phases and ground.

24. The switching system according to claim 17, wherein the load transformer comprises a delta-wye configured load transformer.

25. A ferroresonance-suppressing static transfer switch for switching a load between a first and a second power source, comprising:

switch means configured to couple the first and second power source to the load, the switch means including a first switch input for coupling the switch means to the first power source, a second switch input for coupling the switch means to the second power source, a switch output for coupling the to the load, a first electronic switch electrically in series with the first switch input and the switch output for transferring power between the first power source and the load, and a second electronic switch electrically in series with the second switch input and the switch output for transferring power between the second power source and the load; and a capacitive voltage divider coupled to the switch means and comprising a first snubber capacitor disposed in parallel with the first electronic switch, electrically in series with the first switch input and the switch output, a second snubber capacitor disposed in parallel with the second electronic switch, electrically in series with the second switch input and the switch output, and an attenuating capacitor coupled to the switch output, electrically in parallel with the load, the attenuating capacitor having a capacitance which is substantially greater than a capacitance of the snubber capacitors.

26. The static transfer switch according to claim 25, wherein the capacitance of the attenuating capacitor is at least twice the capacitance of the snubber capacitors.

27. A ferroresonance-suppressing switching system comprising:

a load transformer;

switch means coupled to the load transformer and configured to couple a first and a second power source to the load transformer, the switch means including a first switch input for coupling the switch means to the first power source, a second switch input for coupling the switch means to the second power source, a switch output for coupling the switch means to the load transformer, a first electronic switch electrically in series with the first switch input and the switch output for transferring power between the first power source and the load transformer, and a second electronic switch electrically in series with the second switch input and the switch output for transferring power between the second power source and the load transformer; and a capacitive voltage divider coupled to the switch means and the load transformer and comprising a first snubber capacitor disposed in parallel with the first electronic switch, electrically in series with the first switch input and the switch output, a second snubber capacitor disposed in parallel with the second electronic switch, electrically in series with the second switch input and the switch output, and an attenuating capacitor coupled to the switch output, electrically in parallel with the load transformer, the attenuating capacitor having a capacitance which is substantially greater than a capacitance of the snubber capacitors.

28. The switching system according to claim 27, wherein the capacitance of the attenuating capacitor is at least twice the capacitance of the snubber capacitors.

* * * * *